(12) United States Patent
Meyer-Horn (10) Patent No.: US 8,915,390 B2
(45) Date of Patent: Dec. 23, 2014

(54) SHIPPING CRATE JOINT AND METHOD OF FORMING A SHIPPING CRATE

(71) Applicant: Groupe Dusogat, Chateau-Landon (FR)

(72) Inventor: Félix Meyer-Horn, Brussels (BE)

(73) Assignee: Groupe Dusogat, Melun (FR)

( * ) Notice: Subject to any disclaimer, the term of this patent is extended or adjusted under 35 U.S.C. 154(b) by 177 days.

(21) Appl. No.: 13/713,741

(22) Filed: Dec. 13, 2012

(65) Prior Publication Data

US 2013/0186889 A1 Jul. 25, 2013

(51) Int. Cl.
| | |
|---|---|
| *B65D 6/16* | (2006.01) |
| *B65D 88/00* | (2006.01) |
| *B65D 19/00* | (2006.01) |
| *B65D 25/00* | (2006.01) |
| *B65D 19/16* | (2006.01) |
| *B65D 19/02* | (2006.01) |
| *B65D 6/00* | (2006.01) |
| *F16D 7/04* | (2006.01) |
| *E04B 1/19* | (2006.01) |
| *F16B 7/04* | (2006.01) |
| *F16B 12/46* | (2006.01) |
| *B65D 6/26* | (2006.01) |
| *B23P 11/00* | (2006.01) |
| *B65D 88/12* | (2006.01) |
| *B65D 88/52* | (2006.01) |

(52) U.S. Cl.
CPC ............... *B65D 88/123* (2013.01); *B65D 7/32* (2013.01); *B23P 11/00* (2013.01); *B65D 9/24* (2013.01); *B65D 88/526* (2013.01); *B65D 9/12* (2013.01)
USPC .......... 220/4.33; 220/4.28; 220/1.5; 206/600; 217/65; 217/43 R; 217/43 A; 217/12 R; 217/13; 217/45; 403/169; 403/170; 403/171; 403/176; 403/403

(58) Field of Classification Search
USPC ........ 220/4.33, 4.28, 1.5, 630, 638, 677, 691, 220/682, 685; 206/600; 217/65, 43 R, 43 A, 217/12 R, 13, 45; 403/169, 170, 171, 176, 403/403
See application file for complete search history.

(56) References Cited

U.S. PATENT DOCUMENTS

| 3,315,639 A | * | 4/1967 | Close ............................ 118/642 |
| 5,634,539 A | * | 6/1997 | Gordon ........................... 190/24 |
| 2004/0131416 A1 | * | 7/2004 | Wu et al. ....................... 403/170 |
| 2014/0021090 A1 | * | 1/2014 | Meyer-Horn ................. 206/600 |

\* cited by examiner

*Primary Examiner* — Fenn Mathew
*Assistant Examiner* — Don M Anderson
(74) *Attorney, Agent, or Firm* — Abelman, Frayne & Schwab (57) ABSTRACT

A joint for use in making a shipping crate includes a base and a pair of orthogonal channels which extend upwardly from the base and are open from above. Each channel has an inner closed end and an outer open end, and has a width, along a length of the channel between the inner and outer ends, which is greater than the width at the inner and outer ends. The channel is preferably defined by an outer wall, an inner wall, and a pair of reinforcement members located at the inner and outer ends to define the region of smaller width at each end. The reinforcement members are preferably hollow vertical members which are rectangle or square in cross-section and which extend from the inner wall towards the outer wall. Preferably, at their inner ends, the channels share a reinforcement member.

7 Claims, 8 Drawing Sheets

SHIPPING CRATE JOINT AND METHOD OF FORMING A SHIPPING CRATE

BACKGROUND OF THE INVENTION

Wooden shipping crates are widely used to protect equipment and other products during transportation. Examples of such products and equipment include large automobile parts, e.g., door assemblies, which are shipped from a sub-contractor to the automobile manufacturer. Shipping crates are also commonly employed to protect other types of heavy equipment and products while being transported from the manufacturer or moved from site-to-site.

Figure 1:
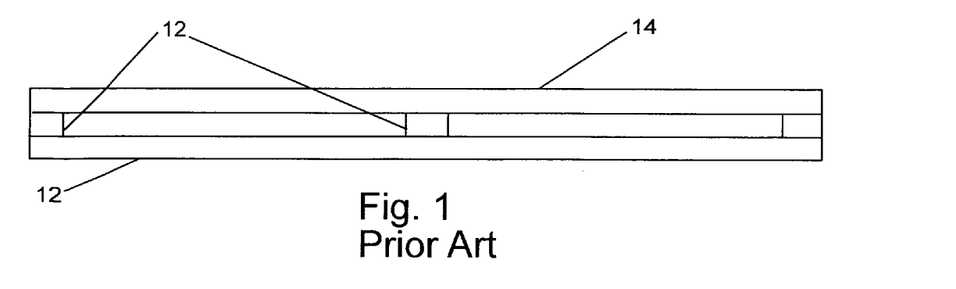
FIG. 1 is a front, schematic view of a typical shipping pallet.

Known shipping crates include a wooden pallet having a rectangular wooden frame which rests on the ground, and an elevated platform nailed onto the wooden frame. An example of a known type of pallet is shown in FIG. 1, and includes a base 10 which rests on the ground, which may be either a solid piece of a plurality of parallel, horizontal boards. A plurality of risers 12 extend from the top surface of the base 10 and are secured to the base 10, e.g., by nails (not shown). Finally, a platform 14, usually formed by a plurality of parallel, horizontal boards extending perpendicular to the riser 12, rests on top of the risers 12 and is secured thereto.

Figure 2:
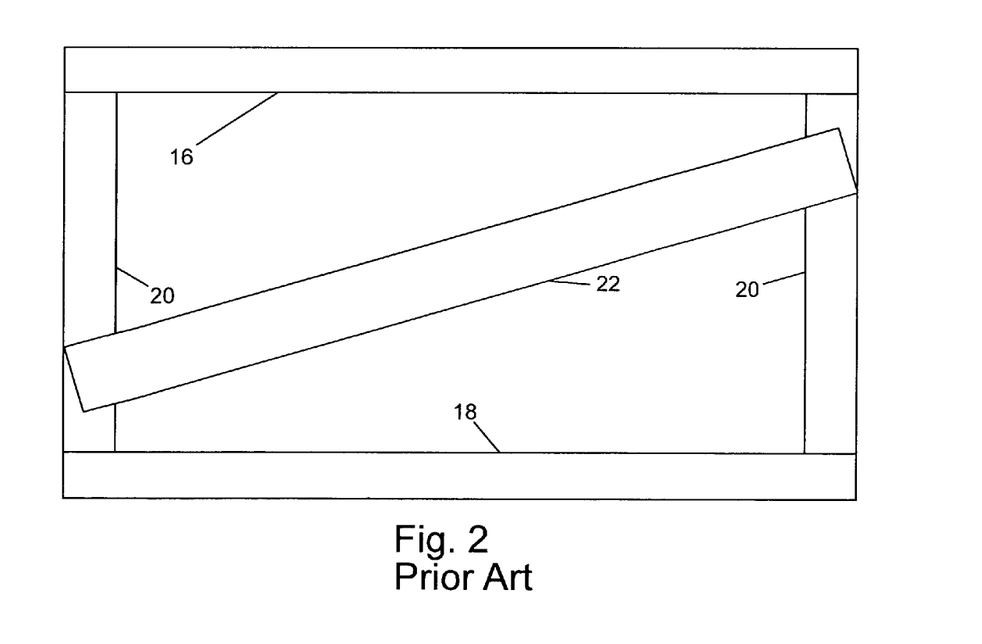
FIG. 2 is a front, schematic view of a typical sidewall of a shipping crate.

The crate also includes four sidewalls made of boards having a rectangular cross-section, e.g., 2×4 inch boards. As shown in FIG. 2, each sidewall has upper and lower horizontally extending boards, 16 and 18, respectively, and a pair of vertical boards 20 nailed to the inwardly facing surface of the opposite ends of the horizontal boards 16, 18, to form a rectangular frame. A diagonal cross board 22 is nailed to the rectangular sidewall to provide strength and rigidity.

Products which are shipped using shipping crates tend to be heavy. And, it is desirable to provide shipping crates in which the space between the product and the crate walls is minimal, in order to tightly surround and secure the product. It would be difficult to move a heavy product into such a crate were the crate to be pre-manufactured. For such reasons, shipping crates are typically formed in situ. Initially, the product being shipped is placed on the elevated platform of a pre-manufactured pallet. Thereafter, four pre-manufactured sidewalls are nailed to the wooden pallet and to each other to complete the shipping crate.

Although the availability of nail guns has reduced the time and manual labor required to manufacture a shipping crate, forming a shipping crate in situ is still relatively time consuming and generally requires two workers, one to position and hold the sidewalls, and the other to nail the sidewalls together and to the pallet. It would be desirable to be able to manufacture a shipping crate in situ more quickly and easily. It would also be desirable to provide a shipping crate assembly which can be formed into a shipping crate by a single worker. It would further be desirable to provide a shipping crate which may be easily disassembled for reuse.

SUMMARY OF THE INVENTION

The present invention, in one form, is a joint for use in making a shipping crate includes a base and a pair of orthogonal channels which extend upwardly from the base and are open from above. Each channel has an inner closed end and an outer open end, and has a width, along a length of the channel between the inner and outer ends, which is greater than the width at the inner and outer ends. The channel is preferably defined by an outer wall, an inner wall, and a pair of reinforcement members located at the inner and outer ends to define the region of smaller width at each end. The reinforcement members are preferably hollow vertical members which are rectangle or square in cross-section and which extend from the inner wall towards the outer wall. Preferably, at their inner ends, the channels share a reinforcement member.

In another form, the invention comprises a kit including eight corner joints as described above, a pallet, and four side sections. Preferably, four of the joints are pre-fixed to the corners of the pallet so that the channels have their open ends facing an adjacent joint and such that the channels are collinear. The kit is assembled by placing the bottom edges of the four sides into the channels of adjacent joints, and then maneuvering upside-down joints over the top edges of the sides.

In another form, the invention is a method for manufacturing a shipping crate using the above-described joint.

As used in the application, "shipping crate" is meant to have a broad meaning and can refer to other types of boxes or crates, whether or not such boxes are used for shipping or some other purpose.

DETAILED DESCRIPTION

Figure 3:
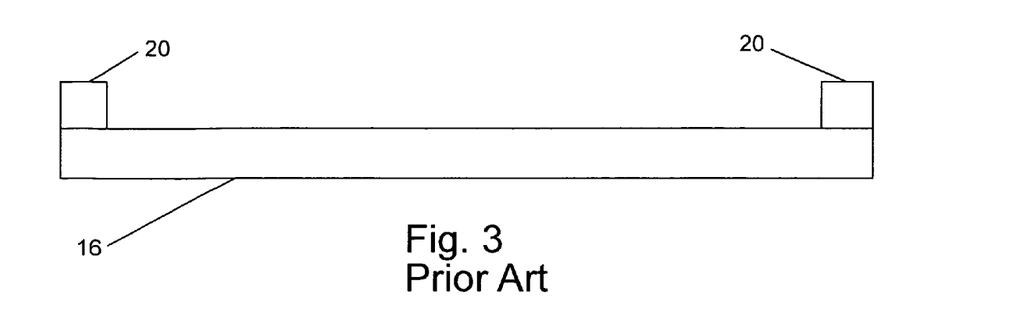
FIG. 3 is a top, schematic view of the sidewall.
Figure 4:
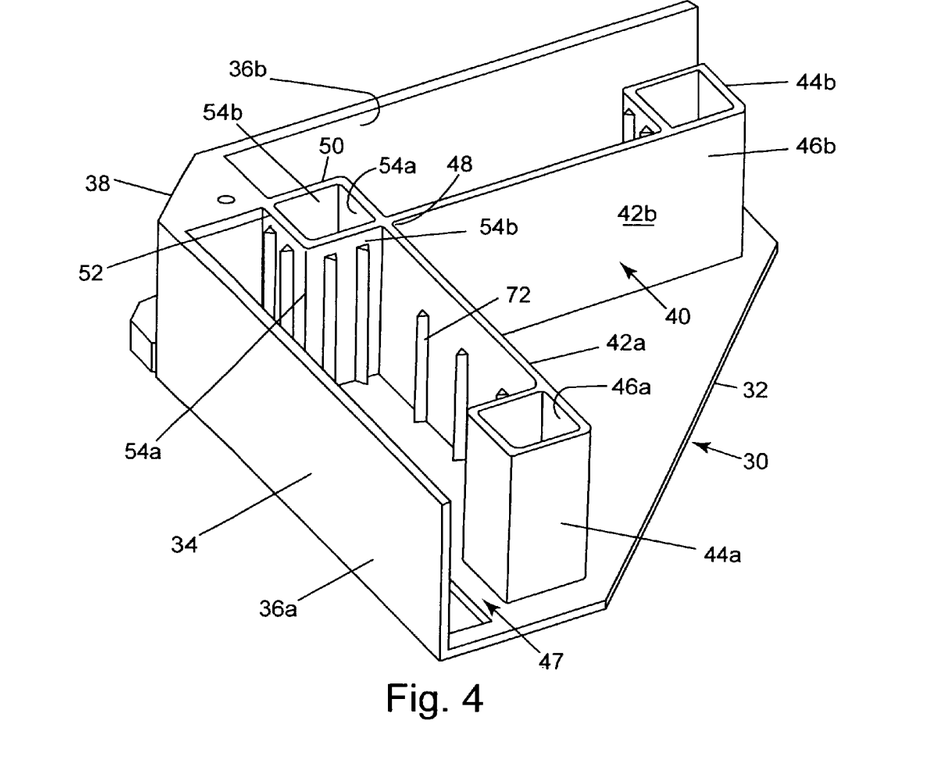
FIG. 4 is a top isometric view of a molded-plastic corner joint according to the invention.
Figure 5:
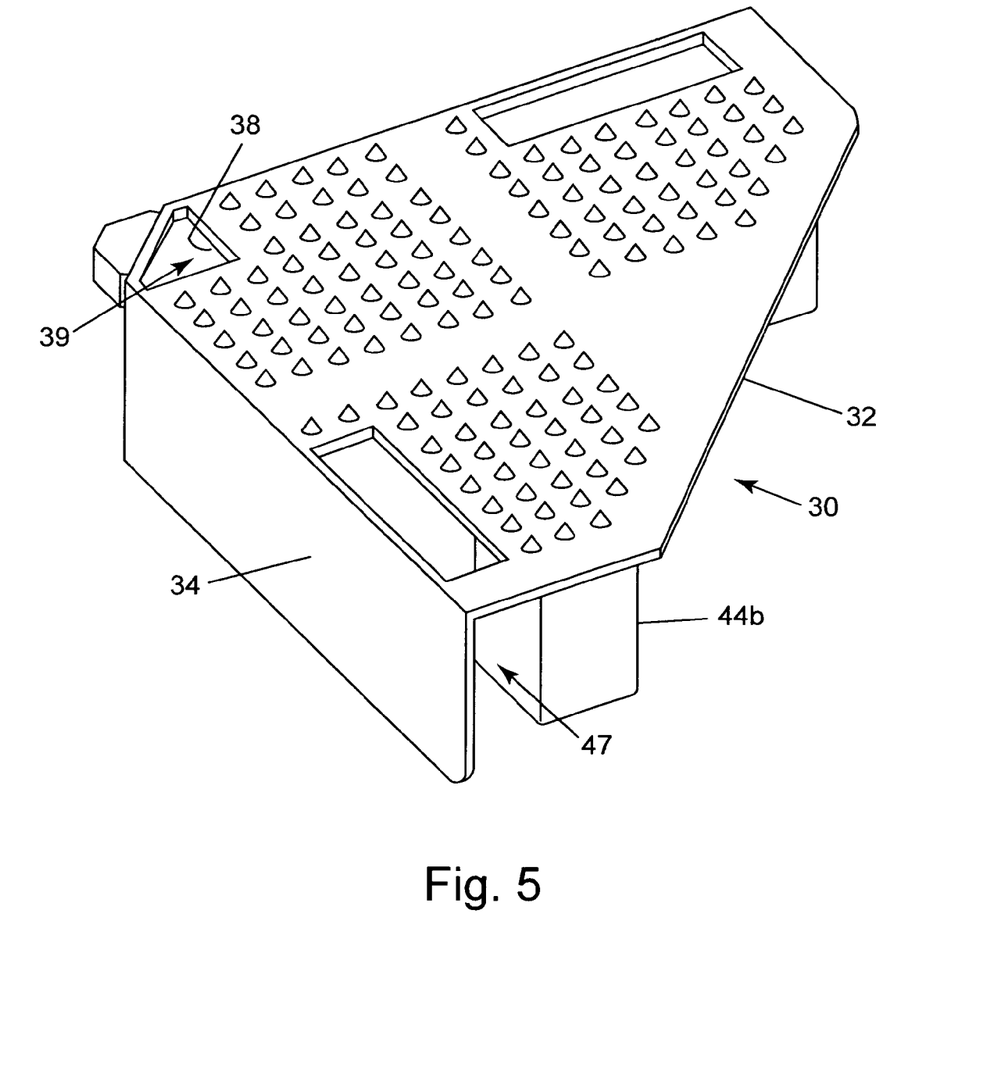
FIG. 5 is a bottom isometric view of the corner joint.

FIGS. 3 and 4 illustrate an example of a corner joint 30 forming part of the present invention. The corner joint 30 includes a base 32, and an outer wall 34 which extends upwardly from the base 32. The outer wall 34 includes first and second outer wall portions 36a, 36b which extend from a connecting section 38 such that the first and second outer wall portions 36a, 36b are perpendicular to one another. The connecting section 38 extends upwardly from the base 32, and has a generally triangular cross-section in a horizontal plane. As shown in FIG. 5, the connecting section 38 preferably has an open bottom 39.

The corner joint 30 further includes an inner wall 40 having first and second wall portions 42a, 42b which are perpendicular to one another. A hollow reinforcement member 44a, 44b, which is preferably square or rectangular in a horizontal cross-section, extends upwardly from the base 32 and shares a common wall with the free ends 46a, 46b of the inner wall 40. Each reinforcement member 44a, 44b extends from the common wall 46a, 46b towards the outer wall 36a, 36b such that a wall portion 45a, 45b, together with the outer wall portion 36a, 36b, define a channel 47 therebetween.

The first and second wall portions 42a, 42b are joined to one another along vertical edge 48. A hollow reinforcement member 50 extends between the edge 48 and a vertical edge 52 of the reinforcement member 38 so as to be joined to both the inner wall 40 and the reinforcement member 38. The reinforcement member 50 is preferably square or rectangular in horizontal cross-section and oriented such that two opposed walls 54a extend parallel to the inner wall section 42a and that the other two opposed walls 54b extend parallel to the inner wall section 42b. As shown, two of the walls of the reinforcement member 50 are extensions of one inner wall section 42a or 42b.

Figure 4A:
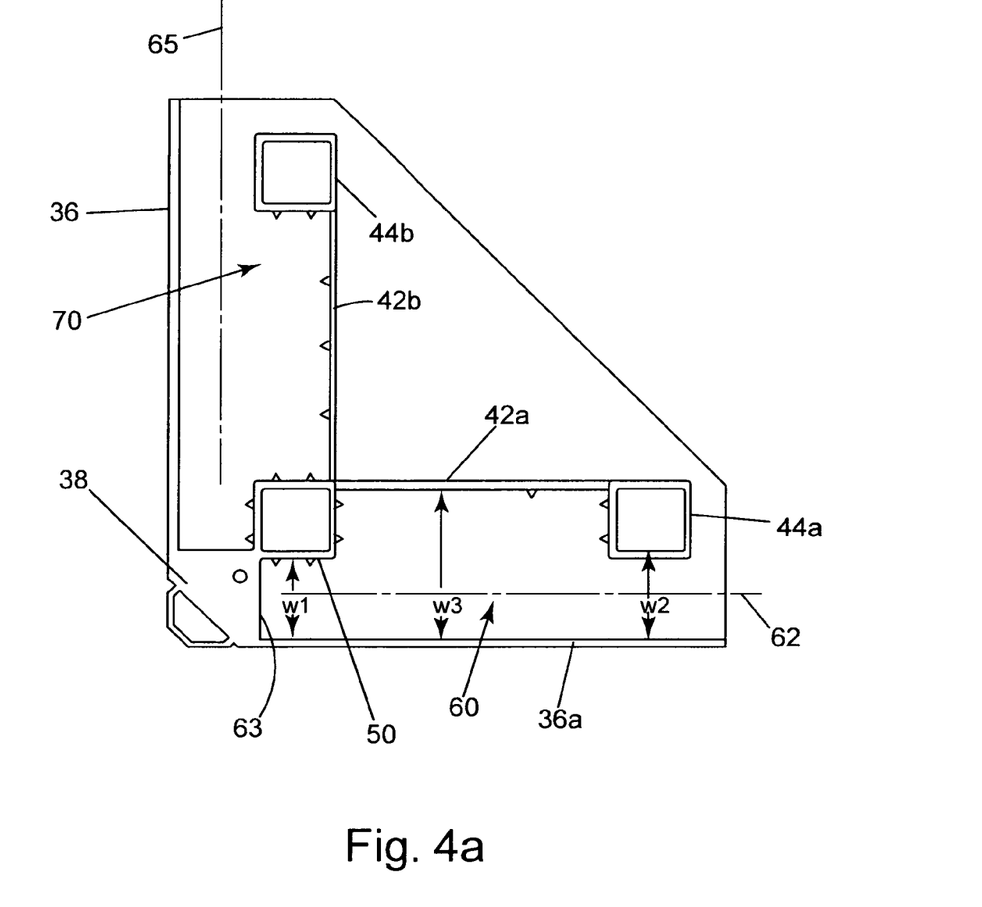
FIG. 4a is a top view of the corner joint of FIG. 4.

Thus, as shown in FIG. 4a, the inner wall section 42a, the reinforcement members 44a, 50, and the outer wall section 36a define a horizontal channel 60 which extends in an axial direction 62 and which is open at the top. Within the channel itself 60, the inner end 63 is closed by one face of the reinforcement member 38, which has a pair of faces perpendicular to the channel axis 62. 63. The outer end 64 of the channel 60 is open. Moreover, such channel has inwardly facing wall portions which provide a first width W1 at an inner end of the channel, a second width W2 at its outer, open end 64, and a third width W3 between the inner and outer ends of the channel which is greater than widths W1 and W2. The widths W1 and W2 may, but need not be, the same. The inner wall section 42a, reinforcement members 44b and 50, and the outer wall section 36b define a similar open channel 70 which extends in a direction 65 perpendicular to the axis 62 of the first channel 60.

As shown in FIGS. 4 and 4a, the inwardly facing walls of the channels may include a plurality of vertically extending projections 72 to help seat the side members securely within the channels.

Figure 6:
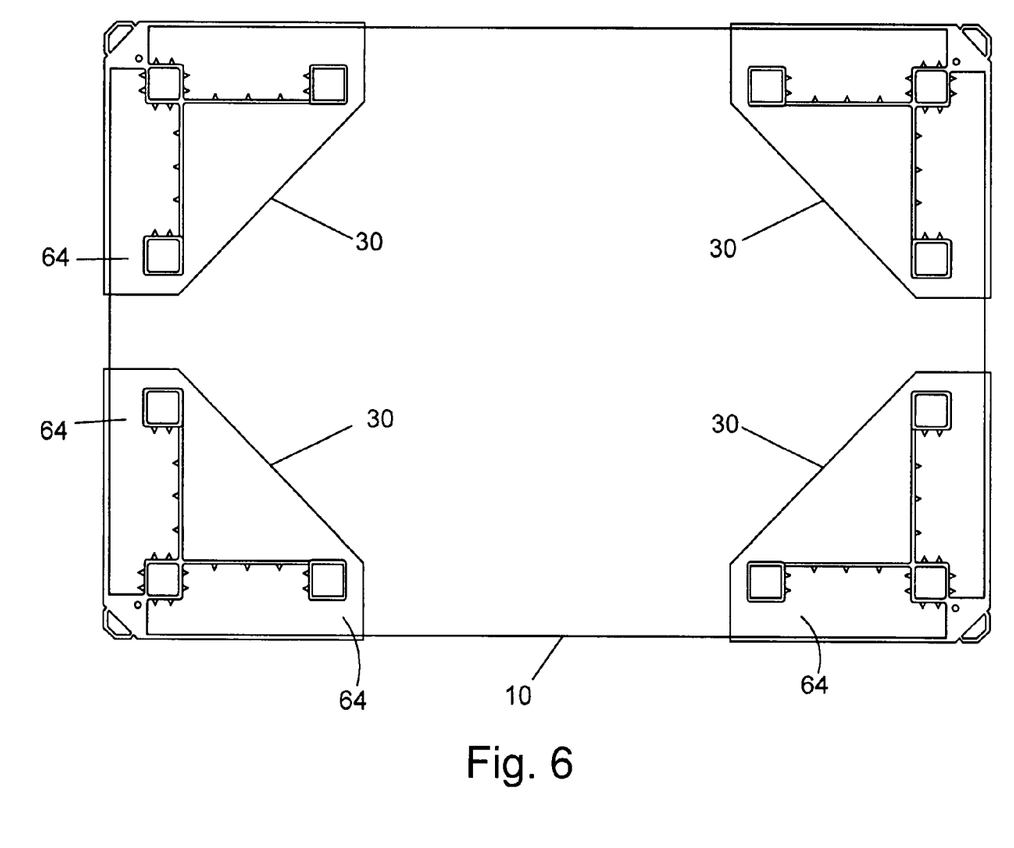
FIG. 6 is a top view of a pallet having corner joints affixed thereto.
Figure 7:
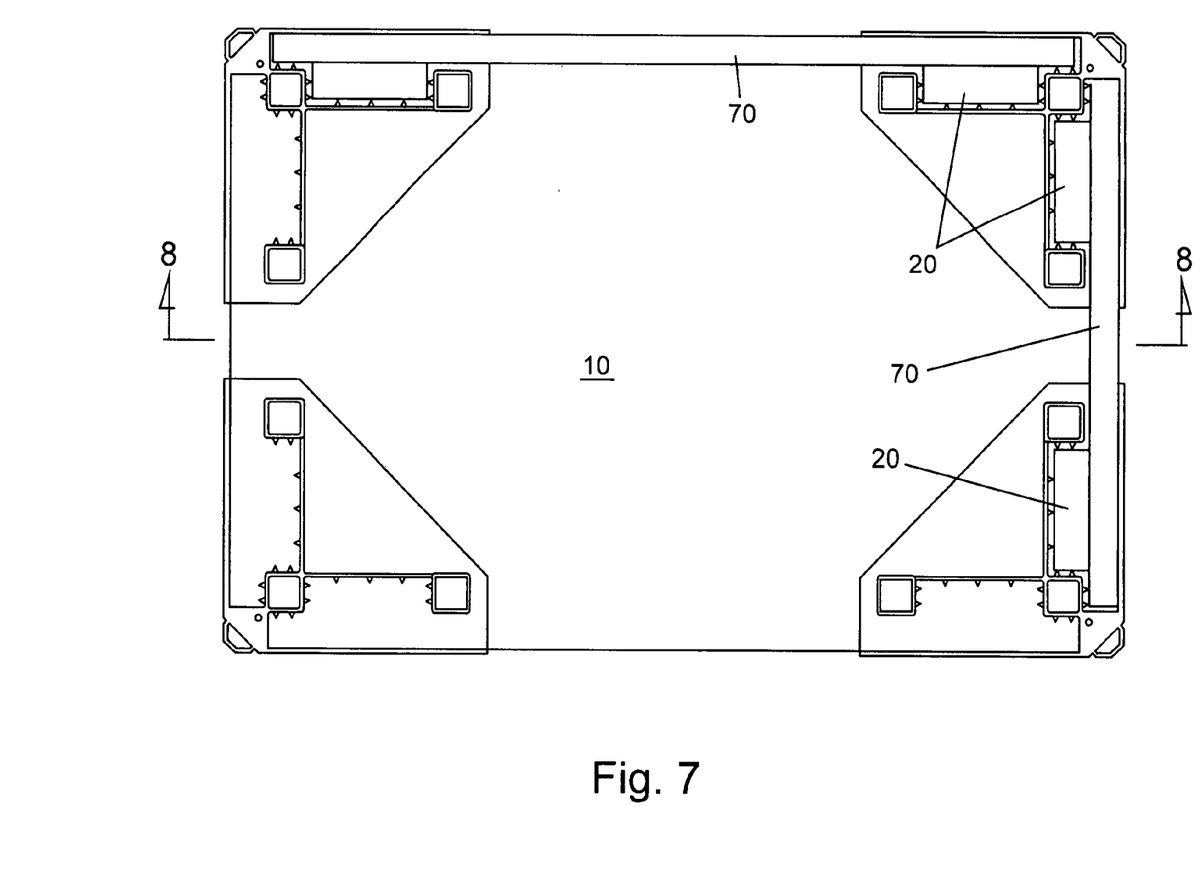
FIG. 7 is a top view of the pallet of FIG. 6 in which the crate has been partially assembled.
Figure 8:
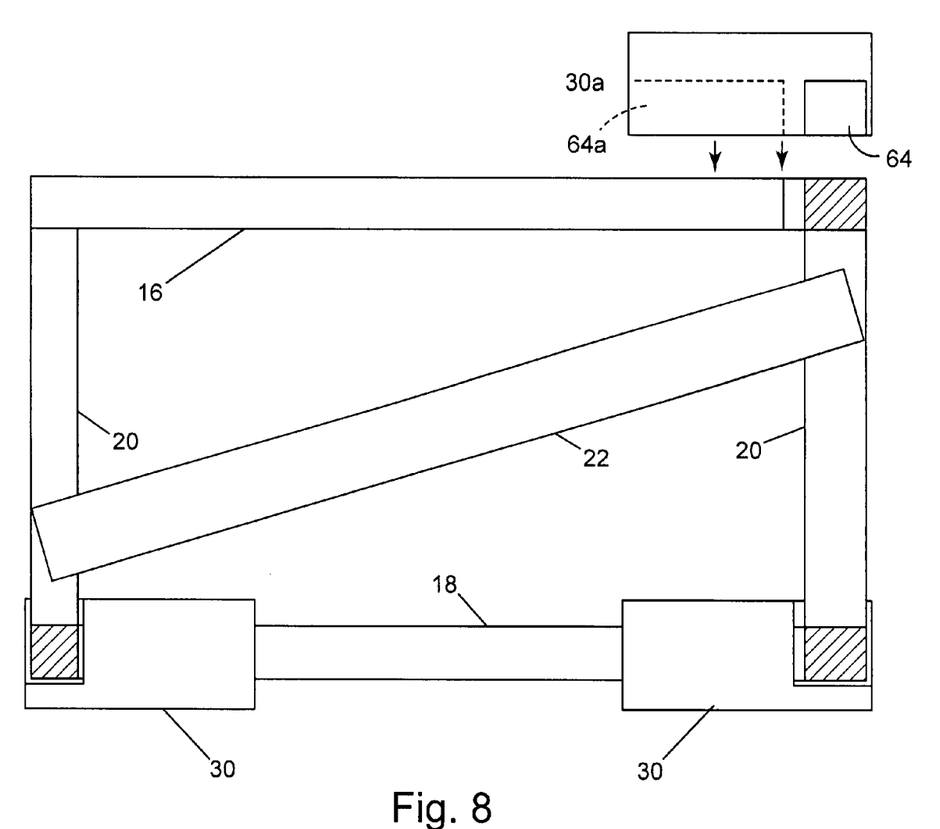
FIG. 8 is a front view of the partially assembled crate of FIG. 7, taken through lines 8-8 of FIG. 7, and illustrating the assembly of an upper corner joint, with the pallet omitted.

Referring to FIGS. 6-8, to manufacture a shipping crate, four corner joints 30 are secured to the corners of a pallet 10 so that the open end 64 of each channel 60 faces the open end 64 of the adjacent corner joint 30 and such that the facing channels of adjacent joints 30 are collinear. As shown in FIG. 7, the lower ends of two adjoining side members 70 are then inserted into the channels of the lower corner joints 30 such that the upwardly extending boards 20 are received in the wider portion of the channel. As is evident, the fact that the boards 20 are secured within the wider portion of each channel ensures that the side members cannot move in a horizontal plane.

Figure 9:
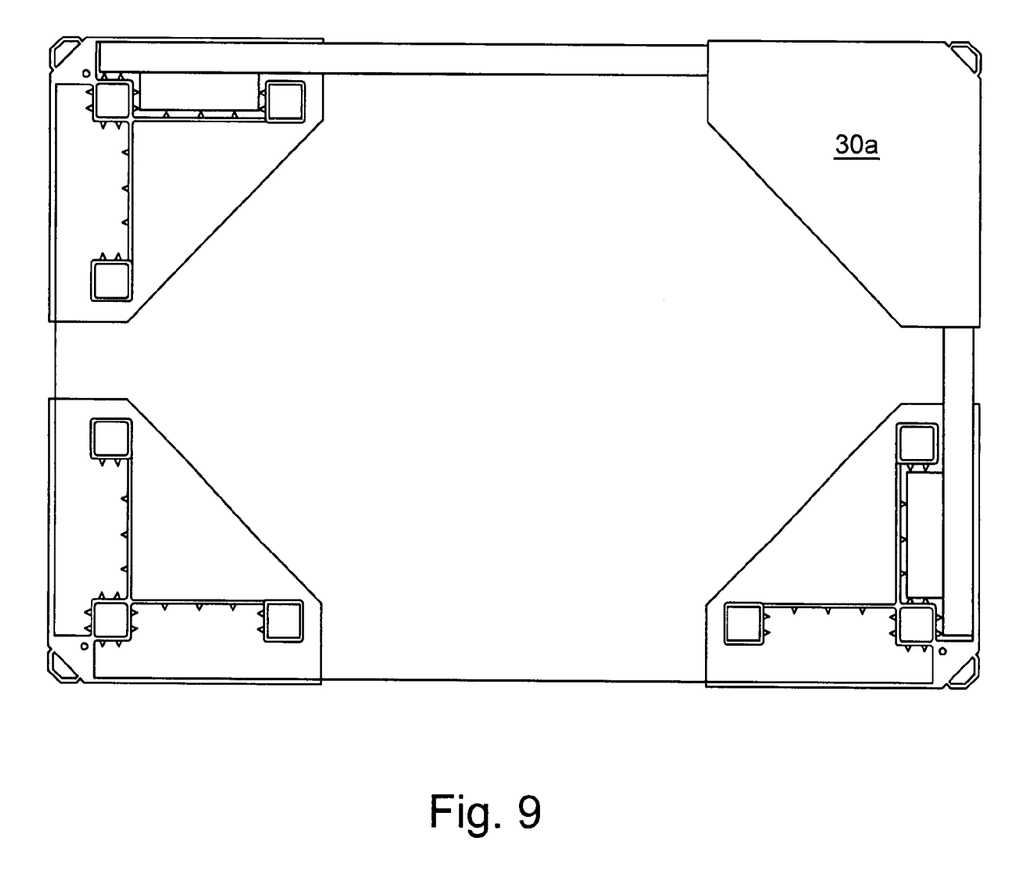
FIG. 9 is a top view of the partially assembled crate of FIG. 8, after the upper corner joint has been engaged.

As shown in FIGS. 8-9, an inverted (i.e., upside-down) joint 30a is moved downwardly into engagement with the upper ends of the two adjoining side members 70, each channel 64, 64a receiving the end of one the two orthogonal side members 70. Again the upper ends of the boards are received in the wider section of the channel so that the upper end of the side members cannot move in a horizontal plane. Thus, once the joint 30a is engaged, the two members 70 are locked relative to one another.

After an initial pair of side members has been secured to one another, the remaining two side members are engaged in a similar manner. Alternatively, all four side members may be inserted into the lower corner joints 30 and the upper joints 30a then applied.

As is evident, the shipping crate according to the invention may be quickly and easily constructed in situ. After an item has been delivered, it can be removed easily by disassembling the crate in the reverse order described above.

If desired, the corner joints 30 may be further secured to the side members to prevent the top joints from being accidently disengaged from the side members, or to prevent the side members inadvertently being lifted from the bottom joints 30.

The step of securing four brackets 30 to a pallet may be done prior to manufacture of the shipping crate itself. In this manner, the shipping crate may be provided or sold as a kit containing a pre-manufactured pallet/brackets, four pre-manufactured sides, and four additional brackets. A person assembling the kit need only insert the four sides into the channels of the brackets attached to the pallet, and then place the four additional brackets (upside down) over the adjoining upper edges of the sides.

The foregoing examples represent the preferred embodiments of the invention. Various modifications will be apparent to persons skilled in the art. All such medications are intended to be within the scope of the patent, as defined in the following claims.

The invention claimed is:

1. A joint for use in manufacturing a shipping crate comprising:
    a base, at least a portion of which lies in a base plane;
    a first wall portion extending perpendicular to said base and defining a first channel:
        which is open from above and longitudinally extends in a first axial direction which lies in a plane parallel to said base plane;
        which has an inner, closed end and an outer, open end;
        which has a width, perpendicular to said axial direction, along a length of said channel between said inner and outer ends which is greater than the width at said inner and outer ends; and
        which has a first width associated with the inner end, a second width associated with the outer end and, a third width along a length of said channel between said inner and outer ends; and
    wherein said second channel extends in a second axial direction which lies in a plane parallel to said base plane, is perpendicular to said first axial direction, and intersects said first axially direction; and
    wherein said channels are oriented such that said open ends are located away from the point where the first and second axial directions intersect.

2. The joint as claimed in claim 1, wherein each said channel is formed by an outer wall portion, an inner wall portion which is spaced from, and generally parallel to, said outer wall portion, and a pair of reinforcement members at said inner and outer ends which extend from said inner wall towards said outer wall.

3. The joint as claimed in claim 2, wherein said reinforcement members have a generally rectilinear shape with a side which faces said outer wall oriented to be parallel to said outer wall, and have another side which is oriented to be perpendicular to said outer wall.

4. The joint as claimed in claim 3, wherein the channels share a common reinforcement member at their closed ends.

5. The joint as claimed in claim 4, comprising an additional reinforcement member which includes a pair of faces which close off the inner ends of the respective channels, each face being oriented perpendicular to the channel axis, which additional reinforcement member extends from an edge of the reinforcement member at the inner end of the channel.

6. A kit for manufacturing a shipping crate comprising:
    a pallet having four corners;
    a joint as recited in claim 1 secured to each corner such that the open ends of each channel face the open ends of a channel of an adjacent bracket;
    four side members, each having a bottom member extending horizontally along a bottom edge and a top member extending horizontally along an upper edge, said top and bottom members having an inner side and an outer side, and wherein said side members have a horizontally projecting portion at each end of said top and bottom boards extending from said inner side, and wherein the bottom member and projecting portions at each end are sized to be securely received within a pair of adjacent channels; and four additional joints as recited in claim 1 for securing the top members and their respective projections to one another.

7. A method of forming a shipping crate comprising the steps of:
  (i) providing a pallet;
  (ii) providing four side members, each having a bottom member extending horizontally along a bottom edge and a top member extending horizontally along an upper edge, said top and bottom members having an inner side and an outer side, and wherein said side members have a horizontally projecting portion at each end of said top and bottom boards extending from said inner side;
  (iii) providing eight joints as recited in claim 1;
  (iv) securing four of said joints to said pallet;
  (v) inserting the bottom edge of opposite ends of said side member into a channel of adjacent joints so that said bottom board is seated in said channel, with said horizontally projecting portion is seated in the wider section of said channel; and
  (vi) inverting the other four joints; and
  (vii) maneuvering the inverted joints such that the top members are received in the channel of adjacent joints with the projecting portion being seated in the wider section of said channel.

\* \* \* \* \*